United States Patent
Ohshita

Patent Number: 5,889,616
Date of Patent: Mar. 30, 1999

[54] EYEPIECE FOR A CAMERA

[75] Inventor: Koichi Ohshita, Tokyo, Japan

[73] Assignee: Nikon Corporation, Tokyo, Japan

[21] Appl. No.: 957,151

[22] Filed: Oct. 24, 1997

[30] Foreign Application Priority Data

Oct. 25, 1996 [JP] Japan ................................. 8-301090

[51] Int. Cl.$^6$ ............................................. G02B 25/00
[52] U.S. Cl. ............................................ 359/646
[58] Field of Search ........................... 359/646, 368, 359/431, 432

[56] References Cited

U.S. PATENT DOCUMENTS

| | | | |
|---|---|---|---|
| 4,730,905 | 3/1988 | Takada | 359/646 |
| 5,034,763 | 7/1991 | Inabata | 354/219 |
| 5,136,427 | 8/1992 | Sugawara | 359/646 |
| 5,410,430 | 4/1995 | Ito et al. | 359/422 |
| 5,434,636 | 7/1995 | Hasushita et al. | 354/219 |
| 5,587,844 | 12/1996 | Ohno | 359/646 |

FOREIGN PATENT DOCUMENTS 6-235870  2/1993  Japan ................. G02B 25/00

*Primary Examiner*—Georgia Epps
*Assistant Examiner*—Michael A. Lucas
*Attorney, Agent, or Firm*—Michael N. Meller

[57] ABSTRACT

A high-performance eyepiece is provided having a high-power magnification finder and a large pupil diameter even if it is used for a camera finder using a pentagonal mirror. The eyepiece includes, in order from the eyepoint end, a negative meniscus lens and a bifocal convex lens, which fulfills the following conditions:

$$0.88 < d1/d3 < 2.7$$

and $$0.15 < r1/f1 < 0.26$$

where:
- d1 is the center thickness of the negative meniscus lens;
- d3 is the center thickness of the biconvex lens;
- r1 is the radius of curvature of the surface at the eyepoint end of the negative meniscus lens; and
- f1 is the focal length of the negative meniscus lens.

16 Claims, 14 Drawing Sheets

EYEPIECE FOR A CAMERA

The present invention relates to an eyepiece. More particularly, the present invention relates to an eyepiece suitable for a single-lens reflex camera.

BACKGROUND OF THE INVENTION

Lenses in a single-lens reflex camera may be easily switched because the photographic lens is used as the objective of a finder. Even when photographing an object at the telephoto end or at close range, parallax does not occur. The single-lens reflex camera, therefore, is popular among those cameras whose lenses can be changed.

A finder of a single-lens reflex camera is a real image type of finder through which a magnified real image of an object formed by a camera lens is observed through an eyepiece having a positive refractive power. A generic single-lens reflex finder erects the image of an object with a so-called "quick return mirror," which is a surface mirror, together with a pentagonal roof prism. It is, then, magnified with an achromatic composite positive eyepiece.

Recently, due to the dramatic advancement of plastic foaming technology, plastics have been applied to optical components with even stringent specifications. One of these optical components includes a Daha mirror, a so-called "pentagonal mirror." With this pentagonal mirror, a lightweight and inexpensive single-lens reflex camera can be manufactured.

However, in a pentagonal mirror finder a mirror is used in place of an optical component constructed with a prism. Therefore, it has a substantially long optical path. As a result, the finder has only a low magnification capability.

In order to resolve the problem, Japanese Laid-open Patent Application (Kokai) H4-37404, discloses an eyepiece of the "retro-focus" type, which comprises, in order from the eyepoint end (eye end), a negative lens and a positive lens. The eyepiece of conventional technology has a short focal length for the overall eyepiece while occupying some back focus, the space required to install a pentagonal mirror. However, the eyepiece of conventional technology disclosed in the above Japanese Kokai has about 4φ pupil diameter. If the pupil of a photographer, using the camera, is open in a dark place, or the photographer's eye is off center from the exit pupil, it is hard on the photographer's eye to see through the finder.

The apparatus incorporating the principles of the present invention provides a high-performance eyepiece which is capable of providing a high-power magnification and provides a large pupil diameter when it is used as a pentagonal mirror finder.

SUMMARY OF THE INVENTION

It is, accordingly, an object of the present invention to overcome the above-noted problems with prior art solutions.

In a preferred embodiment of the present invention, an eyepiece is provided which includes, in order from the eyepoint side, a negative meniscus lens having a concave surface facing toward the eyepoint end of the eye-piece and a biconvex lens. In the preferred embodiment, the eyepiece fulfills the following conditions:

$$0.88 < d1/d3 < 2.7$$

$$0.15 < r1/f1 < 0.26$$

where:

d1 is the thickness on the optical axis of the negative meniscus lens;

d3 is the thickness on the optical axis of the biconvex lens;

r1 is the radius of curvature of the surface at the eyepoint side of the negative meniscus lens; and f1 is the focal length of the negative meniscus lens.

In a further preferred embodiment of the present invention, the surface of the biconvex lens facing toward the object end of the eyepiece is formed aspherically such that its positive refractive power decreases as the distance from the optical axis increases.

In another preferred embodiment, the eyepiece also fulfills the following condition:

$$-0.64 < f2/f1 < -0.45$$

where:

f1 is the focal length of the negative meniscus lens; and f2 is the focal length of the biconvex lens.

In yet another preferred embodiment of the present invention, the eyepiece fulfills the following condition:

$$0.25 < r2/f1 < 0.5$$

where:

f1 is the focal length of the negative meniscus lens; and r2 is the radius of curvature of the surface at the object side of the negative meniscus lens.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
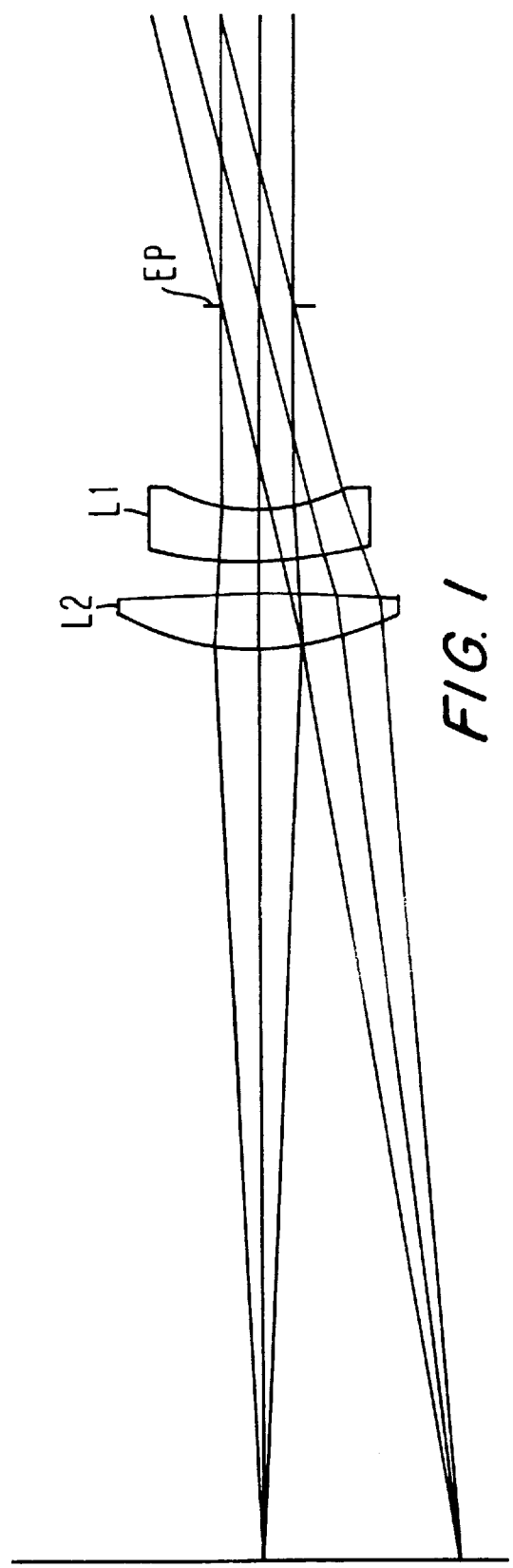
FIG. 1 is a diagram showing a layout of the eyepiece of the first embodiment of the present invention.

Referring to the drawings, and more particularly to FIG. 1, it can be seen that the eyepiece includes, in order from the eyepoint side, two lenses of two groups, which are a negative meniscus lens L1 and a biconvex lens L2.

As illustrated, the lens L1 at the eyepoint side has a negative meniscus shape with a concave surface facing toward the eyepoint (EP). The overall positive refractive power of the eyepiece can be divided into a total of three surfaces, that is, front and back surfaces of the biconvex lens L2 and the surface facing toward the object side (left end in FIG. 1) of the negative meniscus lens L1. This configuration provides a smaller curvature for each of the lenses compared to the configuration in which the negative lens L1 is made in a biconcave shape or in a negative meniscus shape having a convex surface facing toward the eyepoint. As a result, with the illustrated eyepiece, spherical or coma aberrations can be corrected excellently even with a large pupil diameter.

One of the features of the embodiments of the present invention is that the thickness on the optical axis (center thickness) of the negative meniscus lens L1 is larger than the surface separation between the negative meniscus lens L1 and the biconvex lens L2. In general, in a retro-focus type lens, a larger lens separation is required for the front end group having a negative refractive power and the back-end lens group having a positive refractive power. However, in the apparatus incorporating the principles of the present invention, a part of the positive refractive power, which should be given to the back-end biconvex lens L2, is given to the surface at the object end of the negative meniscus lens L1. Increasing the center thickness of the negative meniscus lens L1 is more effective than increasing the separation between the negative meniscus lens L1 and the biconcave lens L2 in reducing the magnitude of the refractive power for each of the lens surfaces. This makes it possible to manufacture a compact optical system because the height of the principal light which passes through the biconvex lens L2 is reduced.

There is a limit to how thin the center thickness of the negative meniscus lens L1 can be. In a finder having a positive lens and a negative lens, more variations are possible with the negative lens than the positive lens to correct chromatic aberration better. As described above, in the apparatus incorporating the principles of the present invention, the surface at the object side of the negative meniscus lens L1 has a positive refractive power. If the center thickness of the negative meniscus lens L1 is made too large, an increase in the magnification chromatic aberration deviation will be inevitable.

To resolve the problem, the apparatus incorporating the principles of the present invention fulfills the following conditions (1) and (2):

$$0.88 < d1/d3 < 2.7 \quad (1)$$

$$0.15 < r1/f1 < 0.26 \quad (2)$$

where:
  d1 is the thickness on the optical axis of the negative meniscus lens L1;
  d3 is the thickness on the optical axis of the biconvex lens L2;
  r1 is the radius of curvature of the surface at the eyepoint end of the negative meniscus lens L1; and
  f1 is the focal length of the negative meniscus lens L1.

Condition (1) defines the ratio of the center thickness of the negative meniscus lens L1 to that of the biconvex lens L2.

If the upper limit of condition (1) is exceeded, the center thickness of the negative meniscus lens L1 becomes too large. This makes it impossible to correct chromatic aberration excellently as described.

If the lower limit of condition (1) is exceeded, the lens separation of the eyepoint end of the negative meniscus lens L1, which is the front end of a retro-focus lens, from the biconvex lens L2, which is the back end of the retro-focus lens becomes too small. This makes it impossible to correct spherical and coma aberrations for a large pupil diameter.

Condition (2) defines the radius of curvature of the surface at the eyepoint end of the negative meniscus lens L1, which is the front group of the retro-focus lens.

If the upper limit of condition (2) is exceeded, the radius of curvature of the eyepoint side of the negative meniscus lens L1 becomes too large. This makes it difficult, to obtain a high-power magnification.

If the lower limit of condition (2) is exceeded, the radius of curvature of the eyepoint side of the negative meniscus lens L1 becomes too small. This makes it difficult to correct various aberrations and also provides a substantially short eyepoint.

Also in the apparatus incorporating the principles of the present invention, the surface at the object side of the biconvex lens L2 is aspherical such that the positive refractive power thereof decreases with distance from the optical axis. In this way, spherical and coma aberrations can be corrected excellently. Note that with the configuration of the embodiments of the present invention, if a spherical surface is introduced onto the surface at the eyepoint end of the negative meniscus lens L1 or that of the biconcave lens L2, coma aberration will not be improved very much. In addition, if an aspherical surface is introduced onto the surface on the object end of the negative meniscus lens L1, coma aberration will improve to some extent and the field curvature will become large.

It is desirable that the following condition (3) is fulfilled in the preferred embodiments of the present invention:

$$-0.64 < f2/f1 < -0.45 \quad (3)$$

where:
  f2 is the focal length of the biconvex lens L2.

When condition (3) is fulfilled, excellent coma aberration correction is obtained and a finder of high-power magnification is provided at the same time.

If the lower limit of condition (3) is exceeded, a high-power magnification may be obtained for a finder. However, the eyepiece will not be able to correct coma aberration for the large pupil diameter, which is not desirable.

If the upper limit of condition (3) is exceeded, coma aberration may be corrected easily. However, high-power magnification may not be obtained for the finder. If a high-power magnification for a finder is desired under these conditions, the optical system will be large-sized, which is not favorable.

It is also desirable to fulfill the following condition (4) in the embodiments of the present invention:

$$0.25 < r2/f1 < 0.5 \quad (4)$$

where:
  r2 is the radius of curvature of the surface at the object side of the negative meniscus lens L1.

Condition (4) relates to the correction of the magnification to chromatic aberration.

If the upper limit of condition (4) is exceeded, magnification chromatic aberration may be corrected easily. However, the positive refractive power of the surface at the object side of the negative meniscus lens L1 becomes weak and the radius of curvature of the surface at the eyepoint end of the biconvex lens L2 becomes large. This makes astigmatism correction difficult.

If the lower limit of condition (4) is exceeded, the positive refractive power of the surface at the object side of the negative meniscus lens L1 becomes too strong. This makes it difficult to correct magnification aberration, which is not desirable.

It is also desirable that the embodiments of the present invention fulfill the following conditions (5) and (6):

$$25 < v2-v1 < 30 \tag{5}$$

$$1.55 < n1 \tag{6}$$

where:

n1 is the refractive index on the d-line of the negative meniscus lens L1;

v1 is the Abbe number of the negative meniscus lens L1; and v2 is the Abbe number of the biconvex lens L2.

Fulfilling condition (5) results in excellent chromatic aberration.

If the upper and lower limits are exceeded, it becomes difficult to correct magnification chromatic aberration, which is not desirable.

Condition (6) needs to be fulfilled for advanced correction of various aberrations.

If the lower limit of condition (6) is exceeded, the curvature of the surface at the eyepoint end of the negative meniscus lens L1 becomes too strong. This not only makes it difficult to correct various aberrations but also makes the eyepoint very short, which is not preferable.

To provide an inexpensive eyepiece incorporating the principles of the present invention, it is desirable that the two lenses be made of plastic. Examples of plastic materials which can fulfill conditions (5) and (6) are polycarbonate resin and polystyrene resin. Polycarbonate resin and polystyrene are suited to negative meniscus lens L1 and methacrylic resin and polyolefin resin are suited to the biconvex lens L2.

In each embodiment of the present invention, an aspherical surface can be expressed by the following mathematical equation (a):

$$S(y)=(y^2/r)/\{1+(1-\kappa \cdot y^2/r^2)^{1/2}\}+C_8 \cdot y^8 \tag{a}$$

where:

y is the height in the direction perpendicular to the optical axis;

S(y) is the sag in the optical axial direction at a height y;

r is the reference radius of curvature;

κ is the conical constant; and $C_8$ is the 8th aspheric surface constant.

In each of the embodiments, an aspherical surface is marked with an asterisk (*) on its right-hand side.

First Embodiment

FIG. 1 is a diagram showing a layout of the eyepiece of the first embodiment of the present invention.

The eyepiece of FIG. 1 is the one used for a single-lens reflex camera finder using a pentagonal mirror. As noted above, it comprises, in order from the eyepoint side, the negative meniscus lens L1 having a concave surface facing toward the eyepoint end and a biconvex lens L2.

The surface at the object end of the biconvex lens L2 is made such that the positive refractive power thereon decreases as the distance from the optical axis increases.

In the first embodiment, the negative meniscus lens L1 is made of polycarbonate and the biconvex lens L2 is made of methacrylic resin. In FIG. 1, EP shows an eyepoint.

In the following Table 1, various lens values of the first embodiment of the present invention are listed. In Table 1, f is the focal length of the overall system; Bf is the back focus, which is the distance along the axis from the surface at the object end of the biconvex lens L2 to a screen; A is the diopter (D: diopter); EP is the eyepoint; P is the pupil diameter, Y is the size of the screen. In addition, the number in the left-hand column shows the lens surface number counted from the eyepoint end; r is the radius of curvature of each of the lens surfaces; d is the lens surface separation for each of the lenses; and n and v are the index of refraction and the Abbe number, respectively, on the d-line ($\lambda$=587.6 nm).

TABLE 1

| f = | 64.994 | EP = | 16.0 |
| Bf = | 71.878 | P = | 6.0 |
| A = | −1.00 | Y = | 15.90 |

| | r | d | n | v |
|---|---|---|---|---|
| 1 (Eyepoint) | ∞ | 16.0000 | | |
| 2 | −15.6020 | 4.0000 | 1.58518 | 30.24 |
| 3 | −28.1080 | 2.5000 | | |
| 4 | 240.9790 | 4.5000 | 1.49108 | 57.57 |
| *5 | −20.6500 | 71.8783 | | |

Aspherical Surface Data r = −20.6500
κ = 0.3400
$C_8$ = 1.2000 × $10^{-11}$

Values Corresponding to Conditions (1) d1/d3 = 0.889
(2) r1/f1 = 0.230
(3) f2/f1 = −0.573
(4) r2/f1 = 0.414
(5) v2 − v1 = 27.33
(6) n1 = 1.585

Figure 2:
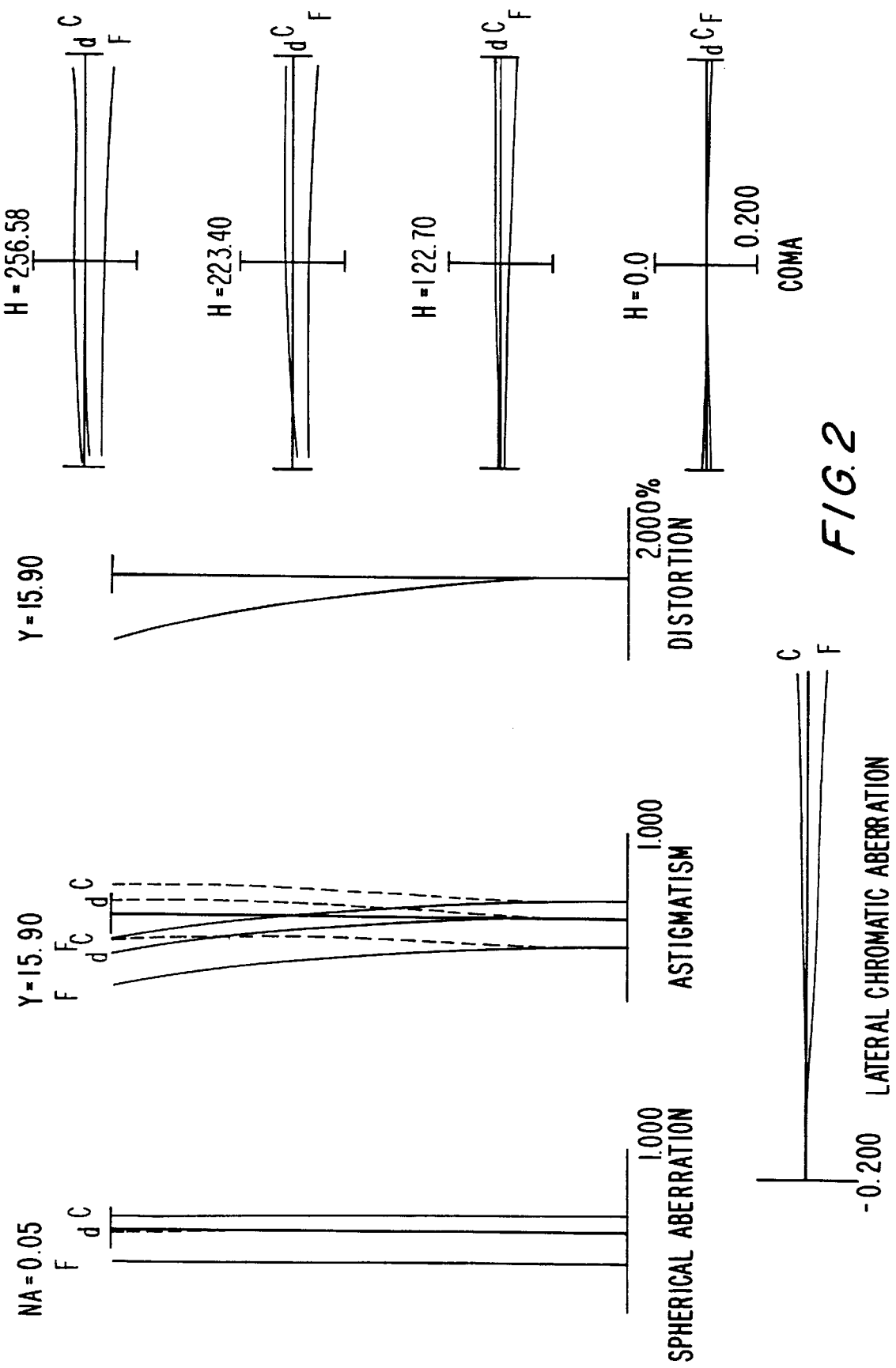
FIG. 2 includes diagrams showing various aberrations of the first embodiment.

FIG. 2 is a diagram showing various aberrations of the first embodiment, while FIGS. 4, 6, 8, 10, 12, and 14 respectively show various aberrations for the second, third, fourth, fifth, sixth, and seventh embodiments, respectively.

In each aberration diagram, NA is the numerical aperture, Y is the image height, H is the object height with respect to each of the image heights, d is the d-line ($\lambda$=587.6 nm), F is the F-line ($\lambda$=486.1 nm), and C is the C-line ($\lambda$=656.3 nm).

In each aberration diagram showing astigmatism, a solid line shows the sagittal image plane and a broken line shows the meridional image plane. In the aberration diagram showing spherical aberration, a broken line shows the sine condition.

As is apparent from the aberration diagram of FIG. 2, various aberrations are excellently corrected for a pupil diameter as big as 6φ.

Second Embodiment

Figure 3:
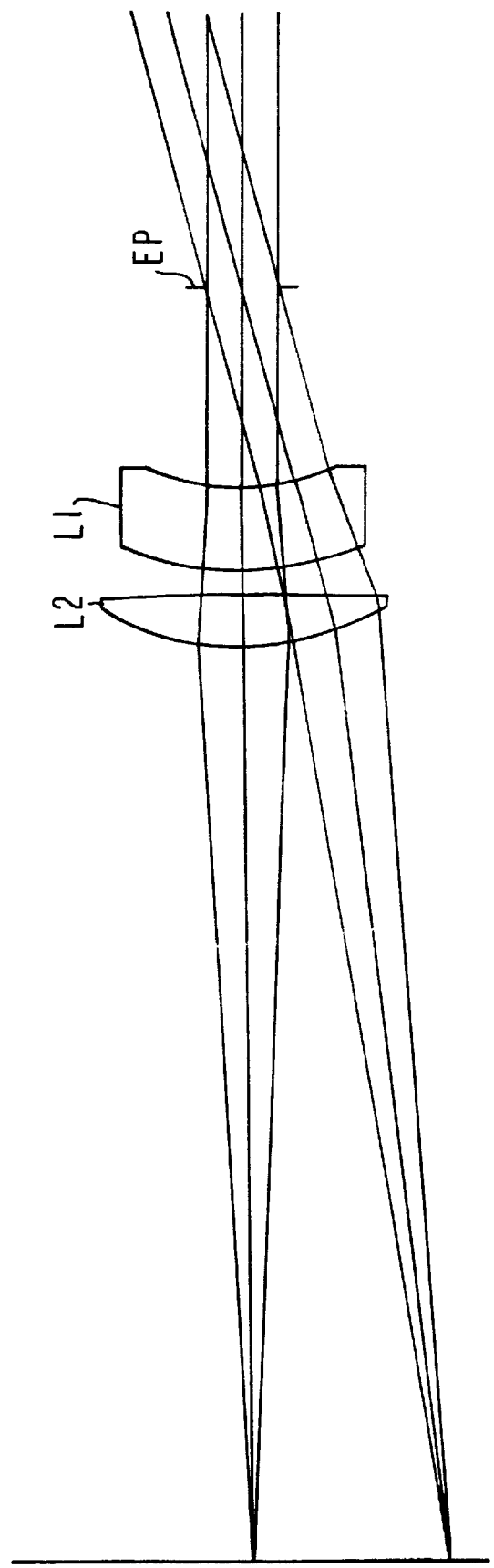
FIG. 3 is a diagram showing a layout of the eyepiece of the second embodiment of the present invention.

FIG. 3 shows the lens layout of the eyepiece of the second embodiment of the present invention.

The eyepiece shown in FIG. 3 also is used for a single-lens reflex camera finder with a pentagonal mirror, as is that of the first embodiment. It comprises, in order from the eyepoint side, a negative meniscus lens L1 having a concave surface facing toward the eyepoint end and a biconvex lens L2.

The surface at the object end of the biconvex lens L2 is formed aspherically such that the positive refractive power thereon decreases as the distance from the optical axis increases.

In the same manner as in the first embodiment, the negative meniscus lens L1 is made of polycarbonate and the biconvex lens L2 is made of methacrylic resin in the second embodiment as well. In FIG. 3, EP shows the eyepoint.

In the following Table 2, various lens values of the second embodiment of the present invention are listed. In Table 2, the same terms are used for designating the features of the eyepiece as those used for the first embodiment.

TABLE 2

| f = | 62.948 | EP = | 16.0 |
|---|---|---|---|
| Bf = | 72.430 | P = | 6.0 |
| A = | −1.00 | Y = | 15.90 |

| | r | d | n | ν |
|---|---|---|---|---|
| 1 (Eyepoint) | ∞ | 16.0000 | | |
| 2 | −15.2012 | 6.0000 | 1.58518 | 30.24 |
| 3 | −28.9340 | 2.0000 | | |
| 4 | 191.7860 | 4.3000 | 1.49108 | 57.57 |
| *5 | −21.1050 | 72.4302 | | |

Aspherical Surface Data r = −21.1050
κ = 0.2900
$C_8$ = 1.4000 × $10^{-11}$

Values Corresponding to Conditions (1) d1/d3 = 1.395
(2) r1/f1 = 0.233
(3) f2/f1 = −0.597
(4) r2/f1 = 0.443
(5) ν2 − ν1 = 27.33
(6) n1 = 1.585

As noted above, FIG. 4 is a diagram showing various aberrations of the eyepiece of the second embodiment.

Figure 4:
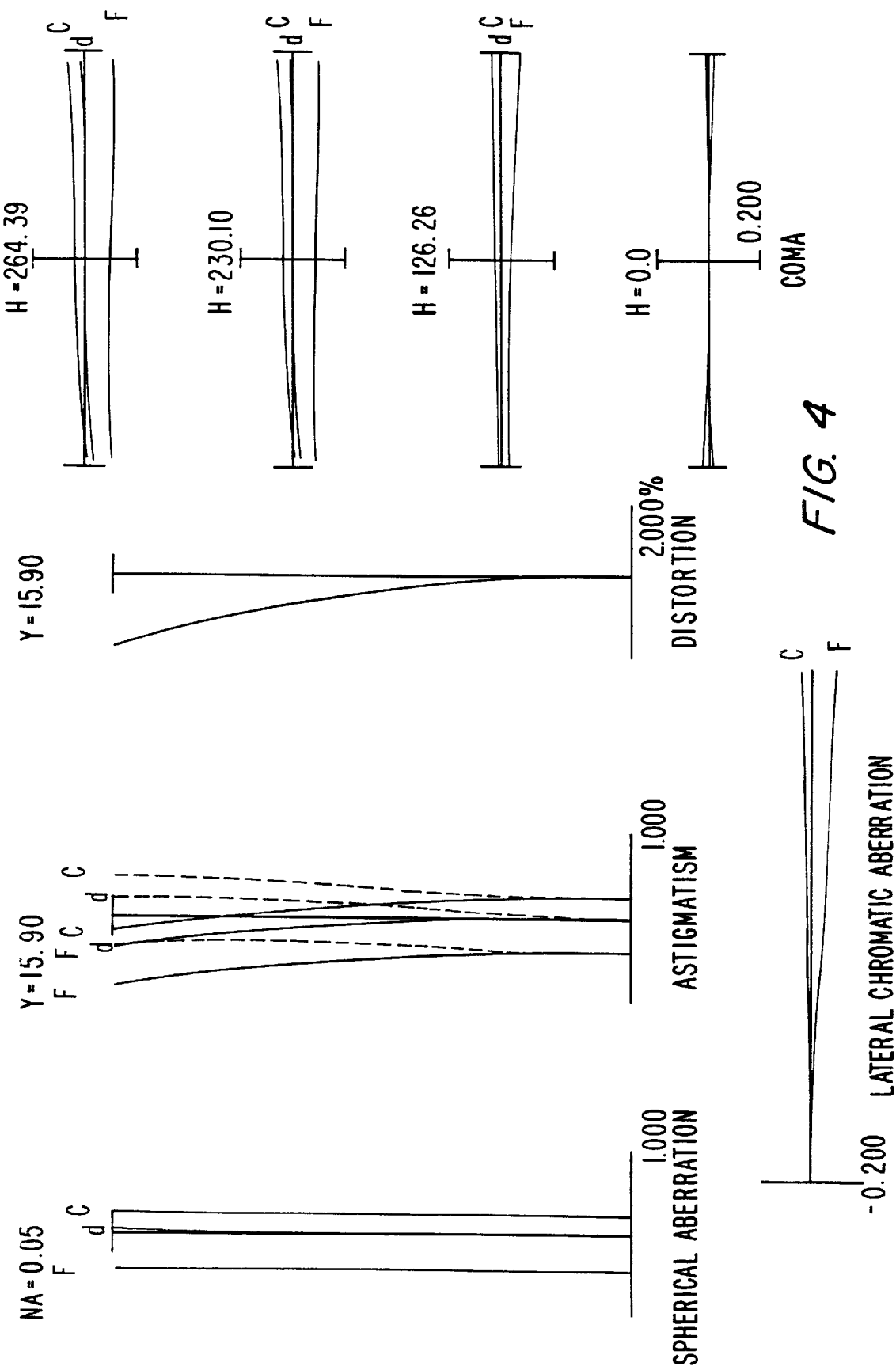
FIG. 4 includes diagrams showing various aberrations of the second embodiment.

As is apparent from the aberration diagram of FIG. 4, various aberrations are excellently corrected for a pupil diameter as big as 6φ.

Third Embodiment

Figure 5:
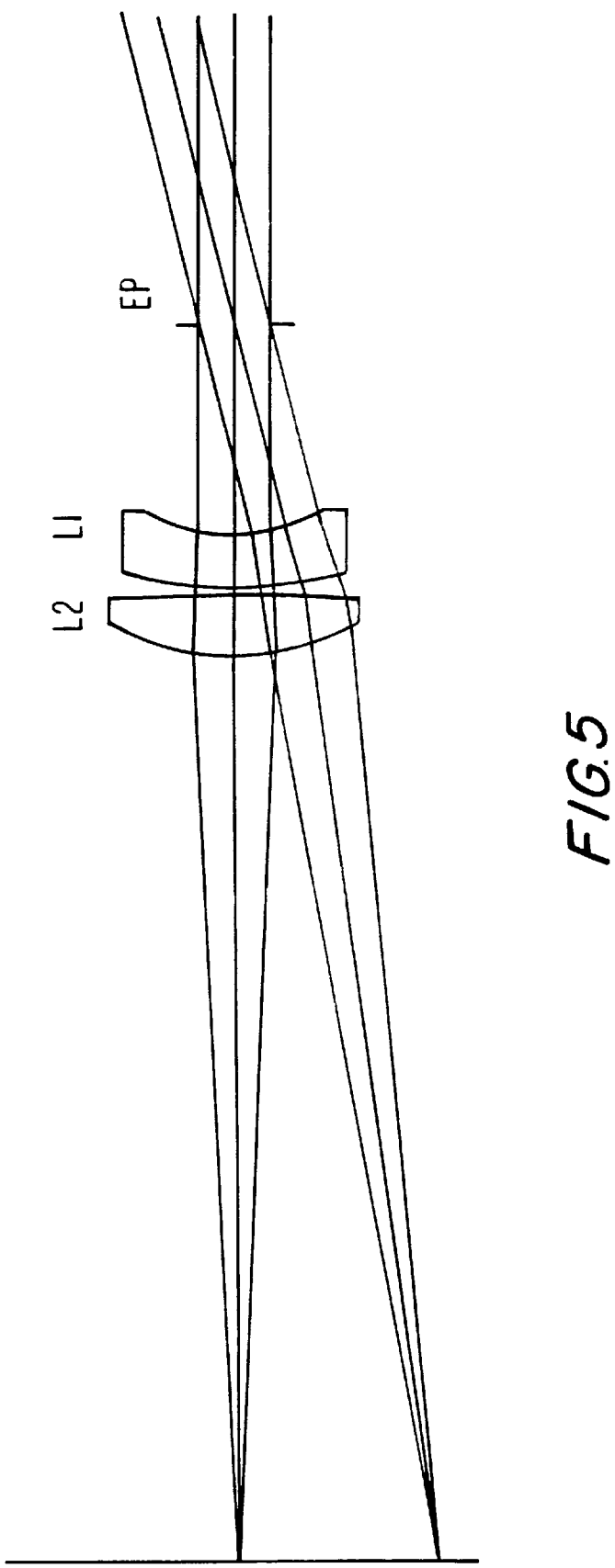
FIG. 5 is a diagram showing a layout of the eyepiece of the third embodiment of the present invention.

FIG. 5 shows the lens layout of the eyepiece of the third embodiment of the present invention.

The eyepiece shown in FIG. 5 is also used for a single-lens reflex camera finder with a pentagonal mirror, as is that of the first embodiment. It comprises, in order from the eyepoint side, a negative meniscus lens L1 having a concave surface facing toward the eyepoint end and a biconvex lens L2.

The surface at the object end of the biconvex lens L2 is formed aspherically such that the positive refractive power thereon decreases as the distance from the optical axis increases.

In the same manner as in the first embodiment, the negative meniscus lens L1 is made of polycarbonate and the biconvex lens L2 is made of methacrylic resin in the third embodiment as well. In FIG. 5, EP shows the eyepoint.

In the following Table 3, various lens values of the third embodiment of the present invention are listed. In Table 3, again the same terms are used as those for the first two embodiments.

TABLE 3

| f = | 66.788 | EP = | 16.0 |
|---|---|---|---|
| Bf = | 71.881 | P = | 6.0 |
| A = | −1.00 | Y = | 15.90 |

| | r | d | n | ν |
|---|---|---|---|---|
| 1 (Eyepoint) | ∞ | 16.0000 | | |
| 2 | −16.6430 | 4.4000 | 1.58518 | 30.24 |
| 3 | −30.8000 | 0.5000 | | |
| 4 | 226.8113 | 4.5000 | 1.49108 | 57.57 |
| *5 | −20.8339 | 71.8810 | | |

Aspherical Surface Data r = −20.8339
κ = 0.3206
$C_8$ = 3.5660 × $10^{-12}$

Values Corresponding to Conditions (1) d1/d3 = 0.978
(2) r1/f1 = 0.238
(3) r2/f1 = −0.559
(4) r2/f1 = 0.441
(5) ν2 − ν1 = 27.33
(6) n1 = 1.585

Figure 6:
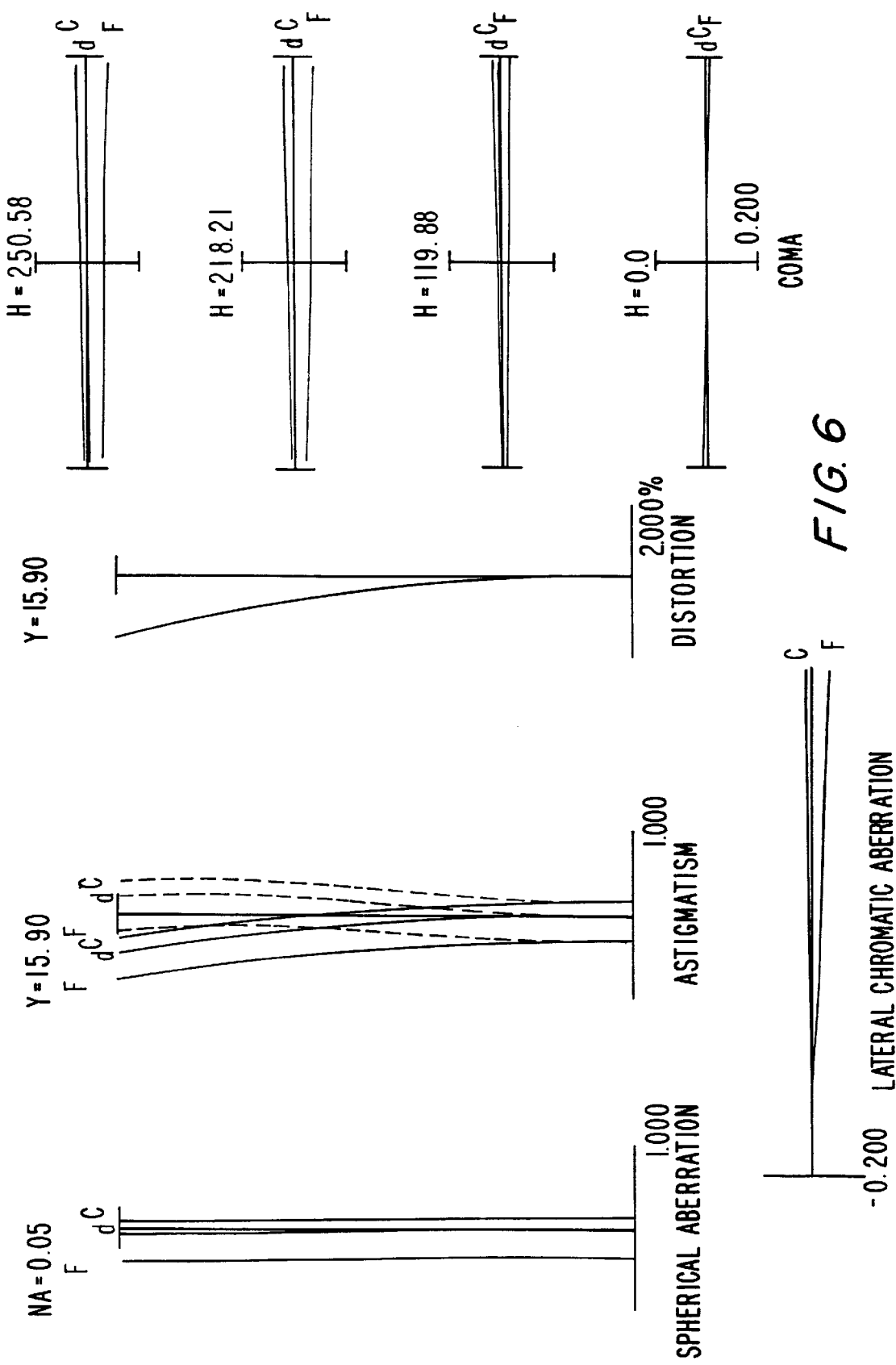
FIG. 6 includes diagrams showing various aberrations of the third embodiment.

Again, FIG. 6 is a diagram showing various aberrations of the third embodiment.

As is apparent from the aberration diagram of FIG. 6, various aberrations are excellently corrected for a pupil diameter as big as 6φ.

Fourth Embodiment

Figure 7:
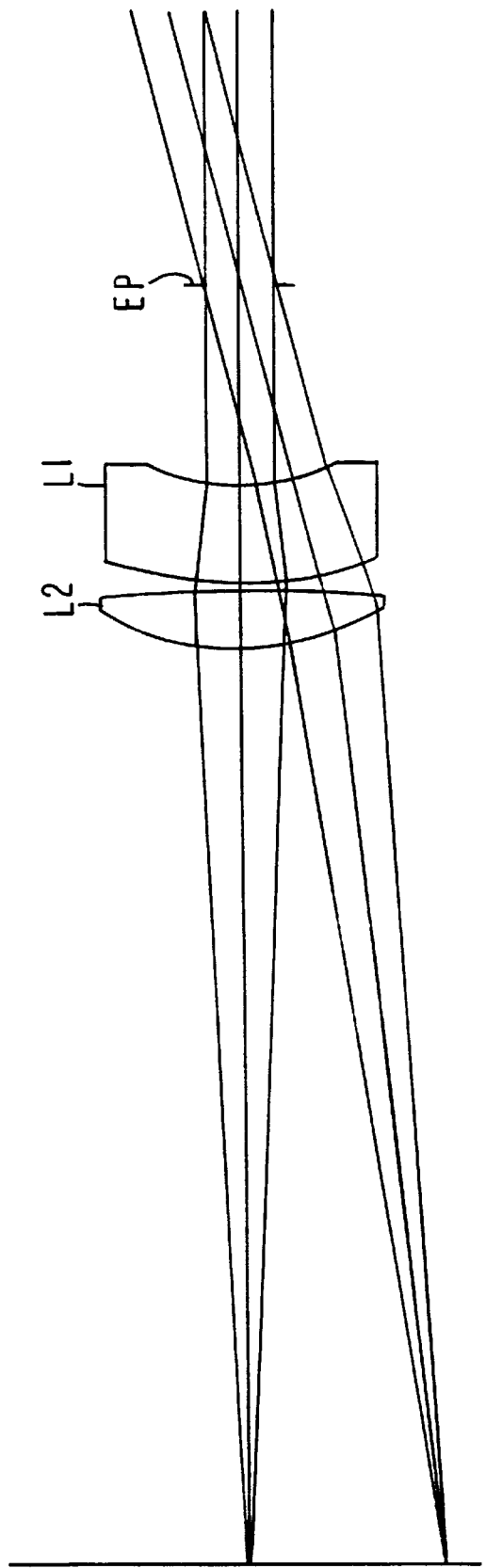
FIG. 7 is a diagram showing a layout of the eyepiece of the fourth embodiment of the present invention.

FIG. 7 shows the lens layout of the eyepiece of a fourth embodiment of the present invention.

The eyepiece shown in FIG. 7 is also used for a single-lens reflex camera finder with a pentagonal mirror as is that of the first embodiment. It comprises, in order from the eyepoint end, a negative meniscus lens L1 having a concave surface facing toward the eyepoint end and a biconvex lens L2.

The surface at the object end of the biconvex lens L2 is formed aspherically such that the positive refractive power thereon decreases with distance from the optical axis.

In the same manner as in the first embodiment, the negative meniscus lens L1 is made of polycarbonate and the biconvex lens L2 is made of methacrylic resin in the fourth embodiment as well. In FIG. 7, EP shows the eyepoint.

In the following Table 4, various lens values of the fourth embodiment are listed. In Table 4, the same identifying terms are used as for the first three embodiments.

TABLE 4

| f = | 61.900 | BP = | 16.0 |
|---|---|---|---|
| Bf = | 72.431 | P = | 6.0 |
| A = | −1.00 | Y = | 15.90 |

| | r | d | n | ν |
|---|---|---|---|---|
| 1 (Eyepoint) | ∞ | 16.0000 | | |
| 2 | −15.0083 | 7.7000 | 1.58518 | 30.24 |
| 3 | −29.5961 | 0.2000 | | |
| 4 | 158.4967 | 4.8000 | 1.49108 | 57.57 |
| 5* | −21.6307 | 72.4310 | | |

Aspherical Surface Data r = −21.6307
κ = 0.2487
$C_8$ = 9.8047 × $10^{-12}$

TABLE 4-continued

Values Corresponding to Conditions

| | | |
|---|---|---|
| (1) | d1/d3 = | 1.604 |
| (2) | r1/f1 = | 0.232 |
| (3) | f2/f1 = | −0.605 |
| (4) | r2/f1 = | 0.458 |
| (5) | ν2 − ν1 = | 27.33 |
| (6) | n1 = | 1.585 |

Figure 8:
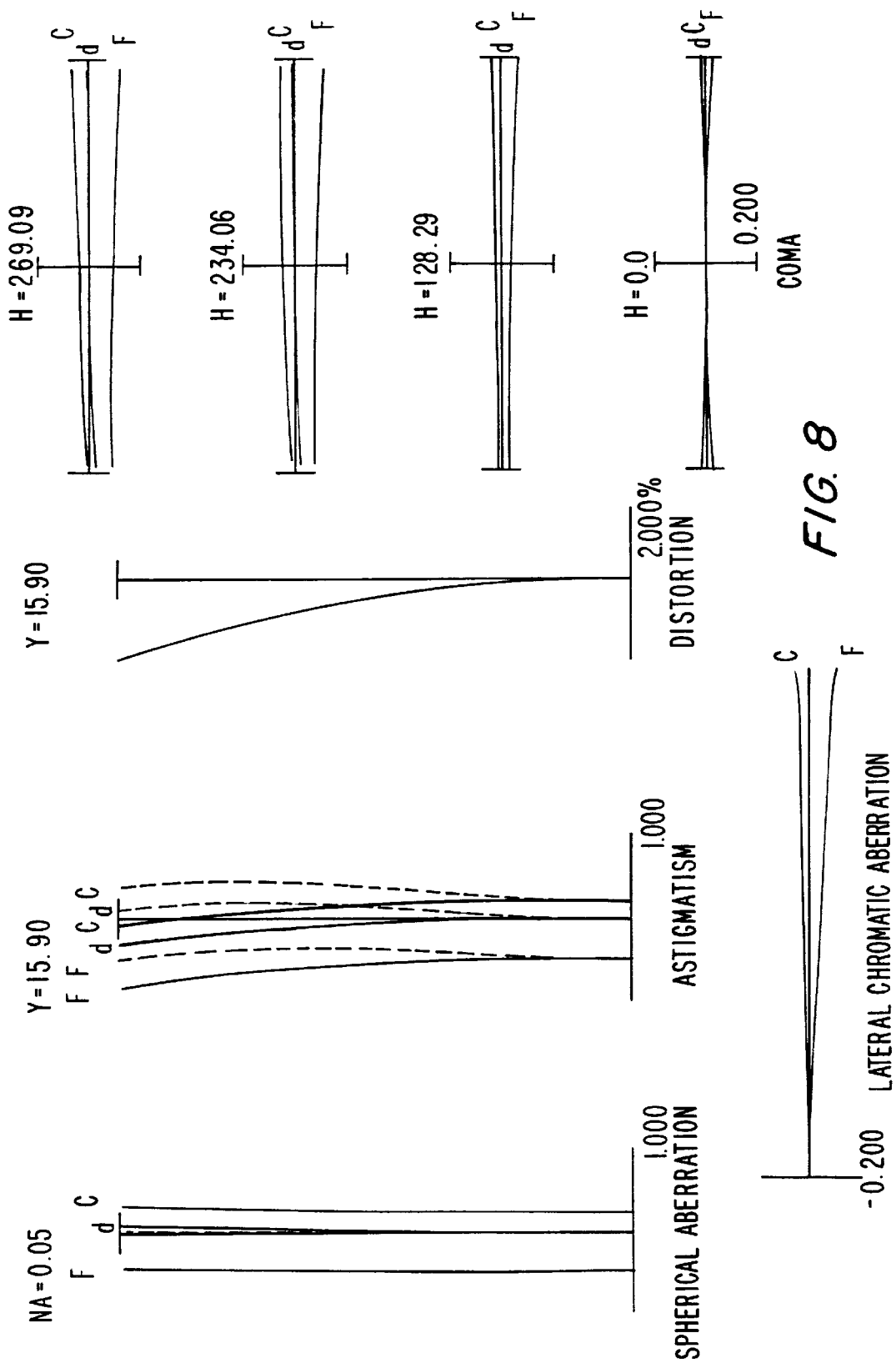
FIG. 8 includes diagrams showing various aberrations of the four embodiment.

As noted, FIG. 8 is a diagram showing various aberrations of the fourth embodiment.

As is apparent from the aberration diagram of FIG. 8, various aberrations are excellently corrected for a pupil diameter as big as 6φ.

Fifth Embodiment

Figure 9:
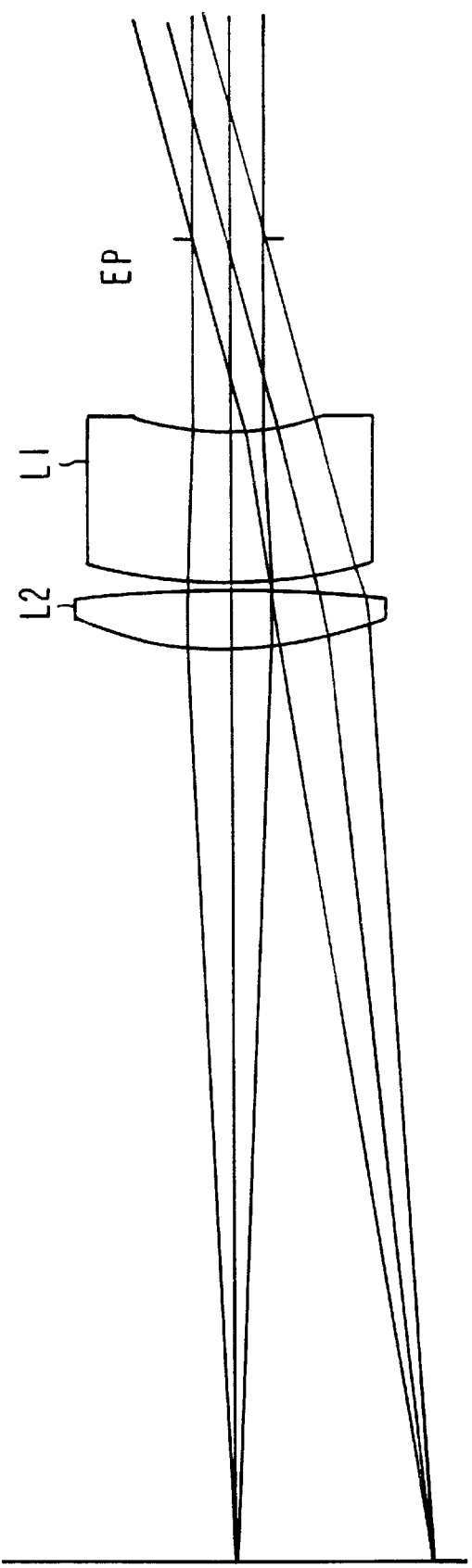
FIG. 9 is a diagram showing a layout of the eyepiece of the fifth embodiment of the present invention.

FIG. 9 shows the lens layout of the eyepiece of the fifth embodiment of the present invention.

The eyepiece shown in FIG. 9 is also used for a single-lens reflex camera finder with a pentagonal mirror, as is that of the first embodiment. It comprises, in order from the eyepoint side, a negative meniscus lens L1 having a concave surface facing toward the eyepoint end and a biconvex lens L2.

The surface at the object end of the biconvex lens L2 is formed aspherically such that the positive refractive power thereon decreases with distance from the optical axis.

As in the same manner as the first embodiment, the negative meniscus lens L1 is made of polycarbonate and the biconvex lens L2 is made of methacrylic resin in the fifth embodiment as well. In FIG. 9, EP shows the eyepoint.

In the following Table 5, various lens values of the fifth embodiment of the present invention are listed. In Table 5, the same nomenclature is used as for the first four embodiments.

TABLE 5

| f = | 62.000 | EP = | 16.0 |
|---|---|---|---|
| Bf = | 72.431 | P = | 6.0 |
| A = | −1.00 | Y = | 15.90 |

| | r | d | n | ν |
|---|---|---|---|---|
| 1 | ∞ | 15.0000 | | |
| (Eyepoint) | | | | |
| 2 | −21.0561 | 12.0000 | 1.58518 | 30.24 |
| 3 | −42.0000 | 0.4000 | | |
| 4 | 90.3494 | 4.8000 | 1.49108 | 57.57 |
| *5 | −29.4996 | 72.4306 | | |

Aspherical Surface Data r = −29.4996
κ = −0.2071
$C_8$ = 6.5860 × $10^{-12}$

Values Corresponding to Conditions

| | | |
|---|---|---|
| (1) | d1/d3 = | 2.500 |
| (2) | r1/f1 = | 0.230 |
| (3) | r2/f1 = | −0.502 |
| (4) | r2/f1 = | 0.459 |
| (5) | ν2 − ν1 = | 27.33 |
| (6) | n1 = | 1.585 |

Figure 10:
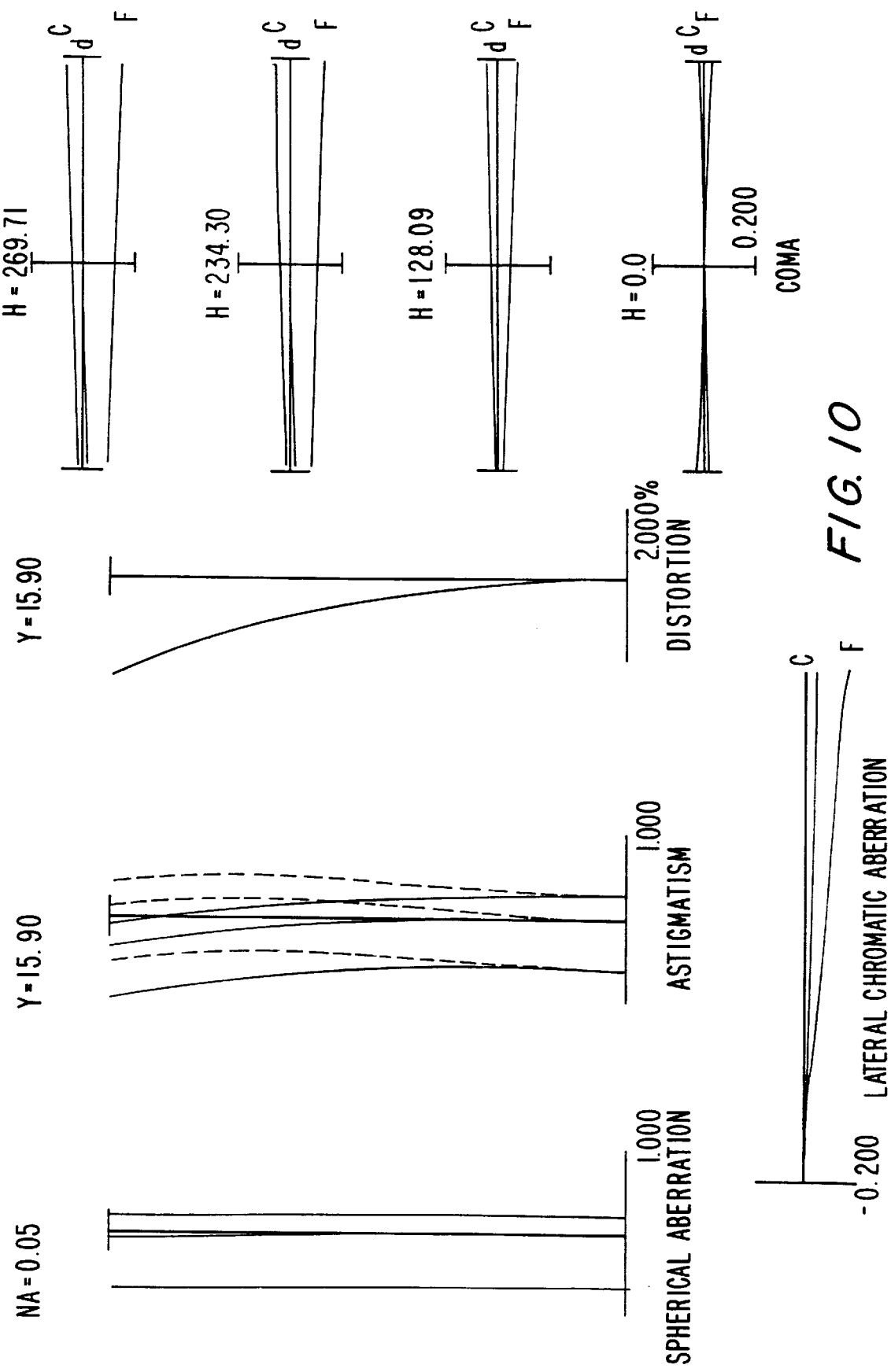
FIG. 10 includes diagrams showing various aberrations of the fifth embodiment.

As indicated, FIG. 10 is a diagram showing various aberrations of the fifth embodiment.

As is apparent from the aberration diagram of FIG. 10, various aberrations are excellently corrected for a pupil diameter as big as 6φ.

Sixth Embodiment

Figure 11:
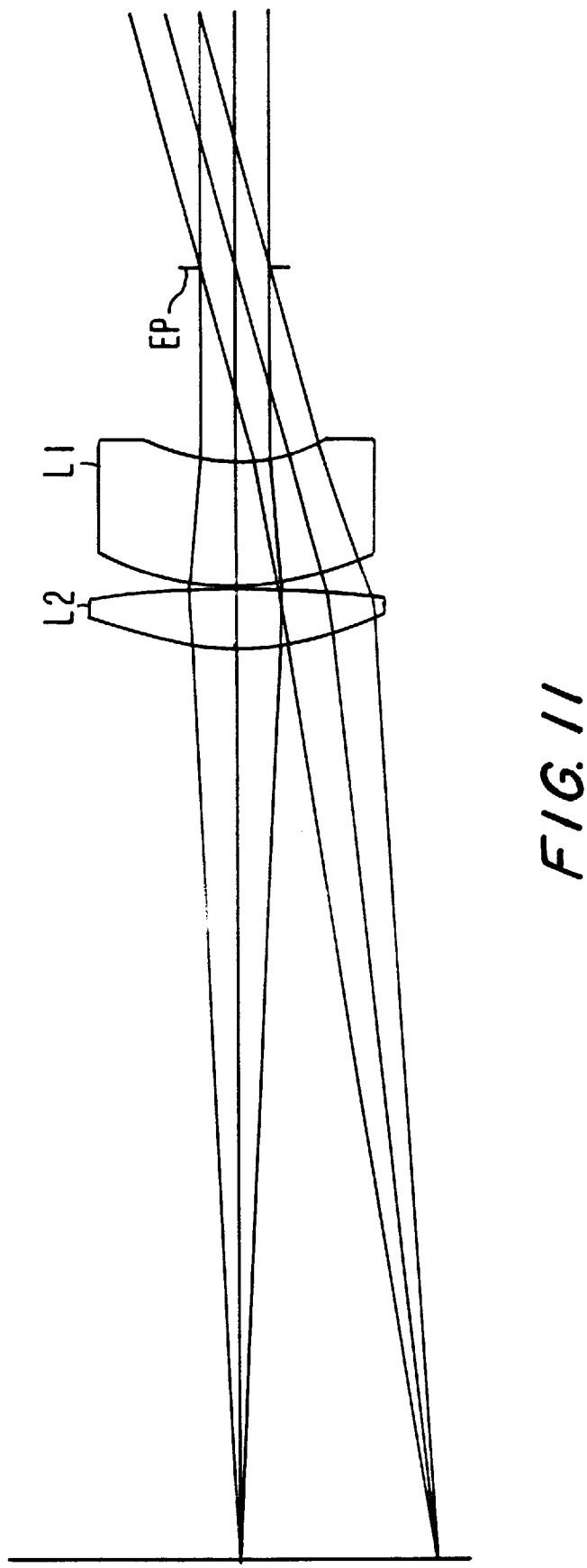
FIG. 11 is a diagram showing a layout of the eyepiece of the sixth embodiment of the present invention.

FIG. 11 shows the lens layout of the eyepiece of the sixth embodiment of the present invention.

The eyepiece shown in FIG. 11 is also used for a single-lens reflex camera finder with a pentagonal mirror, as is that of the first embodiment. It comprises, in order from the eyepoint side, a negative meniscus lens L1 having a concave surface facing toward the eyepoint end and a biconvex lens L2.

The surface at the object end of the biconvex lens L2 is formed aspherically such that the positive refractive power thereon decreases with distance from the optical axis.

In the same manner as in the first embodiment, the negative meniscus lens L1 is made of polycarbonate and the biconvex lens L2 is made of methacrylic resin in the sixth embodiment as well. In FIG. 11, EP shows the eyepoint.

In the following Table 6, various lens values of the sixth embodiment of the present invention are listed. In Table 6, the same terms are used as for the first five embodiments.

TABLE 6

| f = | 60.050 | EP = | 16.0 |
|---|---|---|---|
| Bf = | 72.431 | P = | 6.0 |
| A = | −1.00 | Y = | 15.90 |

| | r | d | n | ν |
|---|---|---|---|---|
| 1 | ∞ | 15.0000 | | |
| (Eyepoint) | | | | |
| 2 | −15.0751 | 9.8000 | 1.58518 | 30.24 |
| 3 | −25.8934 | 0.2000 | | |
| 4 | 162.4552 | 4.8000 | 1.49108 | 57.57 |
| *5 | −26.2157 | 72.4310 | | |

Aspherical Surface Data r = −26.2157
κ = 0.2414
$C_8$ = 6.9118 × $10^{-12}$

Values Corresponding to Conditions

| | | |
|---|---|---|
| (1) | d1/d3 = | 2.042 |
| (2) | r1/f1 = | 0.163 |
| (3) | r2/f1 = | −0.500 |
| (4) | r2/f1 = | 0.280 |
| (5) | ν2 − ν1 = | 27.33 |
| (6) | n1 = | 1.585 |

Figure 12:
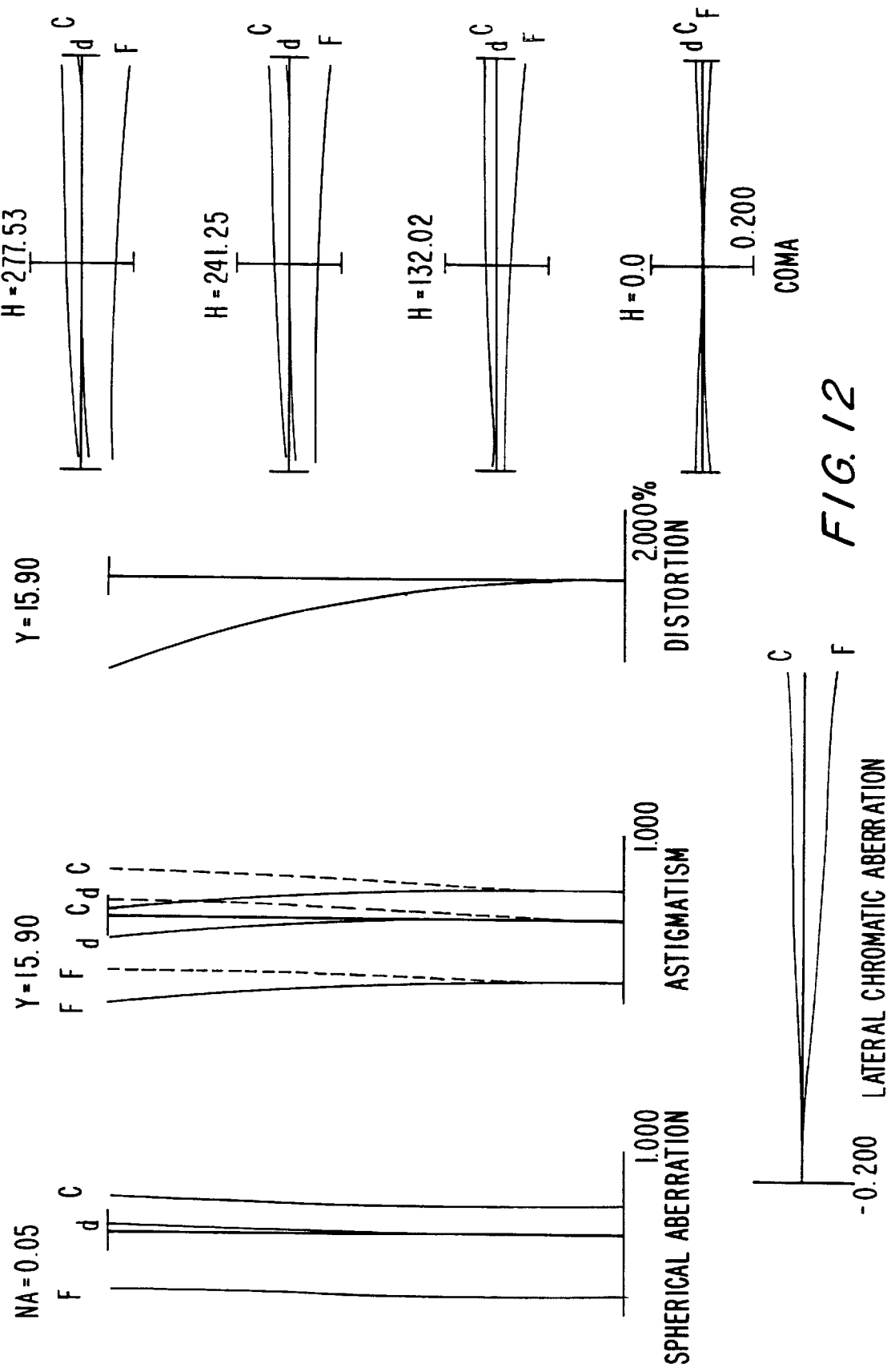
FIG. 12 includes diagrams showing various aberrations of the sixth embodiment.

FIG. 12 is a diagram showing various aberrations of the sixth embodiment.

As is apparent from the aberration diagram of FIG. 12, various aberrations are excellently corrected for a pupil diameter as big as 6φ.

Seventh Embodiment

Figure 13:
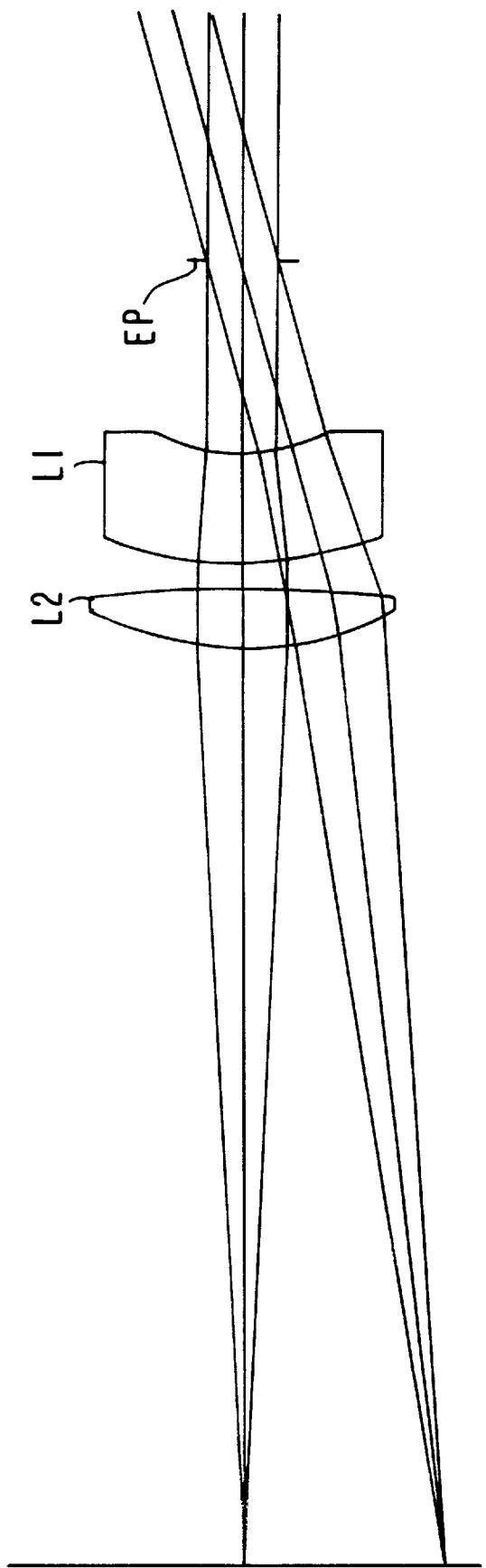
FIG. 13 is a diagram showing a layout of the eyepiece of the seventh embodiment of the present invention.

FIG. 13 shows the lens layout of the eyepiece of the seventh embodiment of the present invention.

The eyepiece shown in FIG. 13 is also used for a single-lens reflex camera finder with a pentagonal mirror, as is that of the first embodiment. It comprises, in order from the eyepoint side, a negative meniscus lens L1 having a concave surface facing toward the eyepoint end and a biconvex lens L2.

The surface at the object end of the biconvex lens L2 is formed aspherically such that the positive refractive power thereon decreases with distance from the optical axis.

As in the same manner as the first embodiment, the negative meniscus lens L1 is made of polycarbonate and the biconvex lens L2 is made of methacrylic resin in the seventh embodiment as well. In FIG. 13, EP shows the eyepoint.

In the following Table 7, various lens values of the seventh embodiment of the present invention are listed. In Table 7, again the same identifying terms are used as for the previous embodiments.

TABLE 7

| f = 60.050 | | EP = 16.0 | |
|---|---|---|---|
| Bf = 72.431 | | P = 6.0 | |
| A = −1.00 | | Y = 15.90 | |

| | r | d | n | ν |
|---|---|---|---|---|
| 1 (Eyepoint) | ∞ | 15.0000 | | |
| 2 | −15.7727 | 9.0000 | 1.58518 | 30.24 |
| 3 | −30.8595 | 1.8000 | | |
| 4 | 116.4201 | 4.8000 | 1.49108 | 57.57 |
| *5 | −24.2800 | 72.4310 | | |

Aspherical Surface Data r = −24.2800
κ = 0.1019
$C_8$ = 1.0602 × 10$^{-11}$

Values Corresponding to Conditions (1) d1/d3 = 1.875
(2) r1/f1 = 0.223
(3) f2/f1 = −0.585
(4) r2/f1 = 0.437
(5) ν2 − ν1 = 27.33
(6) n1 = 1.585

Figure 14:
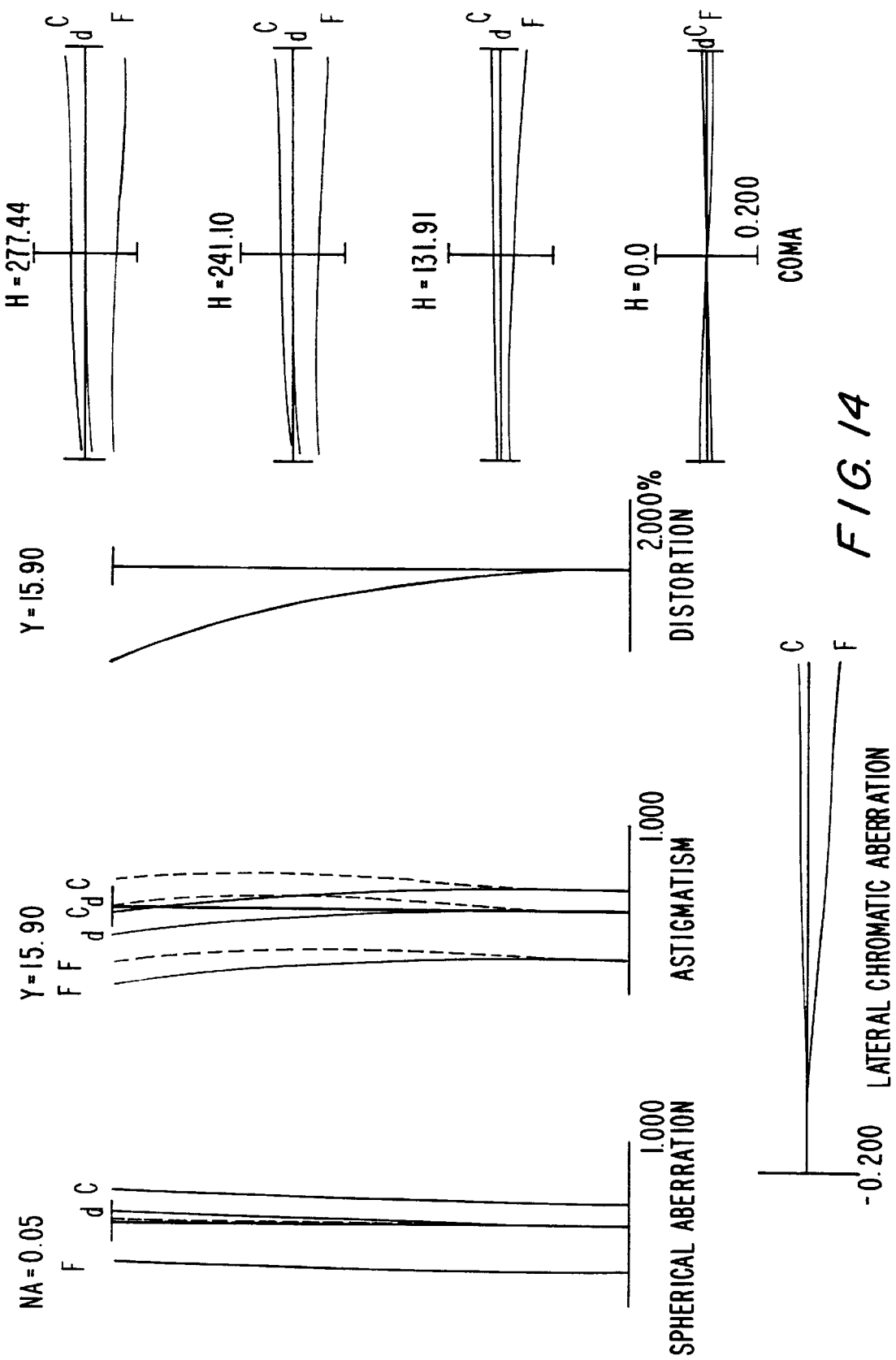
FIG. 14 includes diagrams showing various aberrations of the seventh embodiment.

FIG. 14 is a diagram showing various aberrations of the seventh embodiment.

As is apparent from the aberration diagram of FIG. 14, various aberrations are excellently corrected for a pupil diameter as big as 6φ.

In each of the above embodiments, the negative meniscus lens L1 is made of polycarbonate and the biconvex lens L2 is made of methacrylic resin. By making the negative meniscus lens L1 of polycarbonate, chromatic aberration can be corrected excellently. Also, the index of refraction of polycarbonate is higher than that of methacrylic resin, therefore, various aberrations can be corrected even better.

In addition, in the above embodiments, the focal length of the overall eyepiece lens system is shortened while maintaining a given back focus required for installing a pentagonal mirror, and a high-power magnification can be obtained for the finder.

As described above, each of the embodiments of the present invention provides a high-power eyepiece for a large pupil diameter eyepiece even if the eyepiece is used for a finder with a pentagonal mirror.

The eyepiece incorporating the principles of the present invention can be used not only for a single-lens reflex finder but also for a wide variety of real image type finders.

Various modifications will become possible for those skilled in the art after receiving the teachings of the present disclosure without departing from the scope thereof.

What is claimed is:

1. An eyepiece consisting of, in order from the eyepoint side:
   a negative meniscus lens having a concave surface facing toward said eyepoint end; and
   a biconvex lens wherein
   said eyepiece fulfills the following conditions:

$0.88 < d1/d3 < 2.7$ $0.15 < r1/f1 < 0.26$ where:
   d1 is the thickness on the optical axis of said negative meniscus lens;
   d3 is the thickness on the optical axis of said biconvex lens;
   r1 is the radius of curvature of the surface of said negative meniscus lens at said eyepoint end; and
   f1 is the focal length of said negative meniscus lens.

2. The eyepiece, as claimed in claim 1, wherein the surface of said biconvex lens facing toward the object side of said eyepiece is formed aspherical surface such that the positive refractive power of said surface of said biconvex lens decreases when the distance from the optical axis increases.

3. The eyepiece, as claimed in claim 1, which also fulfills the following condition:

$-0.64 < f2/f1 < -0.45$ where:
   f1 is the focal length of said negative meniscus lens; and
   f2 is the focal length of the surface at the object side of said biconvex lens L2.

4. The eyepiece, as claimed in claim 2, which also fulfills the following condition:

$-0.64 < f2/f1 < -0.45$ where:
   f1 is the focal length of said negative meniscus lens; and
   f2 is the focal length of the surface at the object side of said biconvex lens L2.

5. The eyepiece, as claimed in claim 1, which also fulfills the following condition:

$0.25 < r2/f1 < 0.5$ where:
   f1 is the focal length of said negative meniscus lens; and
   r2 is the radius of curvature of said negative meniscus lens at the object side.

6. The eyepiece, as claimed in claim 2, which also fulfills the following condition:

$0.25 < r2/f1 < 0.5$ where:
   f1 is the focal length of said negative meniscus lens; and
   r2 is the radius of curvature of said negative meniscus lens at the object side.

7. The eyepiece, as claimed in claim 3, which also fulfills the following condition:

$0.25 < r2/f1 < 0.5$ where:
   f1 is the focal length of said negative meniscus lens; and
   r2 is the radius of curvature of said negative meniscus lens at the object side.

8. The eyepiece, as claimed in claim 4, which also fulfills the following condition:

$0.25 < r2/f1 < 0.5$ where:
   f1 is the focal length of said negative meniscus lens; and
   r2 is the radius of curvature of said negative meniscus lens at the object side.

9. The eyepiece, as claimed in claim 1, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

10. The eyepiece, as claimed in claim 2, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

11. The eyepiece, as claimed in claim 3, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

12. The eyepiece, as claimed in claim 4, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

13. The eyepiece, as claimed in claim 5, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

14. The eyepiece, as claimed in claim 6, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

15. The eyepiece, as claimed in claim 7, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

16. The eyepiece, as claimed in claim 8, which is used for a single-lens reflex camera finder and fulfills the following conditions:

$$25 < v2-v1 < 30$$

$$1.55 < n1$$

where:
- n1 is the refractive index on the d-line of said negative meniscus lens;
- v1 is the Abbe number of said negative meniscus lens; and
- v2 is the Abbe number of said biconvex lens.

* * * * *